2,909,577

SEPARATION OF HEXANE ISOMERS

William H. Clingman, Jr., Texas City, Tex., assignor to The American Oil Company, Texas City, Tex., a corporation of Texas No Drawing. Application July 29, 1957
Serial No. 674,571

4 Claims. (Cl. 260—676)

This invention relates to the separation of mixtures of branched chained hexane isomers, particularly separating diisopropyl from 2-methyl pentane.

The demand for high octane number motor gasoline has forced refiners to the expedient of blending individual high octane compounds. Diisopropyl (2,3-dimethylbutane) is an extremely high octane compound. Unfortunately the very closely boiling hexane isomers 2-methyl pentane and 3-methyl pentane are of much lower octane number. The alpha separation factor by distillation between these hexane isomers is very low and it is prohibitively expensive to separate these materials by fractional distillation. It is an object of the invention to separate mixtures of branched chained hexane isomers into fractions enriched with respect to particular isomers. A further object is the separation of diisopropyl from methyl pentanes and particularly 2-methyl pentane. Other objects will become apparent in the course of the detailed description.

The separation method of the instant invention involves the liquid-liquid contacting of a mixture of branched chained hexane isomers with a perfluoro-tri-alkylamine solvent. Sufficient perfluoro-tri-alkylamine is present to produce a separate solvent phase containing dissolved hexanes. The separate hydrocarbon phase is separated from the solvent phase. The hydrocarbon phase, i.e., raffinate phase, is enriched with respect to one of the hexane isomers present in the feed. On the other hand the hexane isomers dissolved in the solvent are enriched with respect to another isomer.

Any mixture of branched chain hexane isomers may be separated by the method of the invention. It has been found that diisopropyl and 2-methyl pentane mixtures are particularly responsive to the separation technique, and it is preferred to operate on a feed consisting essentially of these two isomers.

The perfluoro-tri-alkylamine solvent may be any one of these compounds. The amines which contain from 2 to 6 carbon atoms in the alkyl group are particularly suitable. Examples of these amines are perfluoro-tri-n-propylamine and perfluoro-tri-n-butylamine.

The perfluoro-tri-n-butylamine is particularly suitable because of the very high density difference between the solvent and the hexanes.

Some separation is obtainable by utilizing only a small excess of solvent, i.e., just barely enough to form a separate solvent phase. It is preferred to use more than this minimum amount of solvent and in general between about 0.2 to 10 mols of solvent per mol of hexane isomer feed is used. In order to obtain very high purity materials it is necessary to operate in a multiple stage contacting device which may be a tower or a series of batch countercurrent contacting zones. Also a reflux of extract hydrocarbons must be added to the contacting apparatus in order to obtain these very high purities. It is to be understood that for many purposes the separations that are obtainable by a very small number of separation stages will be sufficient.

To illustrate the invention the separation of diisopropyl from 2-methyl pentane is described. A feed mixture derived from a petroleum source contains 20% of diisopropyl the remainder essentially only 2-methyl pentane. It is desired to obtain a diisopropyl product containing 85% of this material. This result is attained by introducing the feed mixture into a liquid-liquid contacting tower affording about 35 theoretical extraction stages. In this operation 7 mols of perfluoro-tri-n-butylamine were used per mol of feed charged. The separation is carried out at about 25° C. although somewhat higher temperatures may be used if desired. The extract phase consisting of solvent and hexane isomers is separated into a solvent bottoms and a hexane overhead by distillation. The extract hydrocarbons are refluxed to the extraction operation in such amount that the reflux ratio is about 35 mols per mol of extract product. The raffinate phase from the extraction operation contains about 3 mol percent of dissolved solvent which may be separated from the diisopropyl product by distillation.

The liquid-liquid extraction technique is quite similar to the usual liquid-liquid separation carried out in petroleum refining and need not be described herein in detail.

Test 1

In this test the beta separation factor was determined for a mixture of diisopropyl and 2-methyl pentane. The separation factors were determined on feeds containing various amounts of diisopropyl. The results of these determinations are set out below.

| Mol percent diisopropyl in feed: | Separation factor |
|---|---|
| 15 | 1.27 |
| 25 | 1.20 |
| 34 | 1.26 |
| 49 | 1.32 |

The average separation factor of 1.26 obtained for this separation at room temperature contrasts with the separation factor alpha for distillatively separating these two materials of 1.07 at 60° C. In order to obtain a diisopropyl product containing 85% diisopropyl by distillation it would be necessary to utilize about 100 theoretical plates at a reflux ratio of 67:1.

Test 2

In this test beta separation factors were determined for various mixtures of diisopropyl and 3-methyl pentane. The results of these determinations are set out below.

| Mol percent diisopropyl in feed: | Separation factor |
|---|---|
| 15 | 1.38 |
| 25 | 1.20 |
| 34 | 1.22 |
| 50 | 1.17 |

The average separation factor obtained of 1.24 is still appreciably better than the distillative alpha separation factor for this system of 1.18.

It can be seen from the above data that a relatively simple clean separation can be made between diisopropyl and 2-methyl pentane utilizing the defined perfluoro-tri-alkylamines as compared with the expensive, both in operation and apparatus, distillative separation previously known.

What is claimed is:

1. A method of separating mixtures of branched chain hexane isomers which comprises contacting a liquid mixture of at least two liquid hexane isomers with sufficient liquid perfluoro-tri-alkylamine solvent to form a separate phase, and separating a liquid hydrocarbon phase enriched in one of said isomers from a liquid solvent phase containing dissolved hydrocarbon.

2. A method of separating diisopropyl from methyl pentane which comprises contacting a liquid feed consisting essentially of diisopropyl and methyl pentane with a liquid perfluoro-tri-alkylamine solvent, in an amount sufficient to form a separate liquid solvent phase and separating said solvent phase from a liquid hydrocarbon phase enriched in methyl pentane.

3. The method of claim 2 wherein said methyl pentane is 2-methyl pentane.

4. The method of claim 2 wherein said amine is perfluoro-tri-n-butylamine.

References Cited in the file of this patent

UNITED STATES PATENTS

| | | |
|---|---|---|
| 2,402,954 | Francis | July 2, 1946 |
| 2,692,227 | Cines | Oct. 19, 1954 |